E. L. GILMORE.
LANTERN SLIDE EXHIBITION APPARATUS.
APPLICATION FILED AUG. 1, 1916.
1,245,454.
Patented Nov. 6, 1917.
5 SHEETS—SHEET 1.
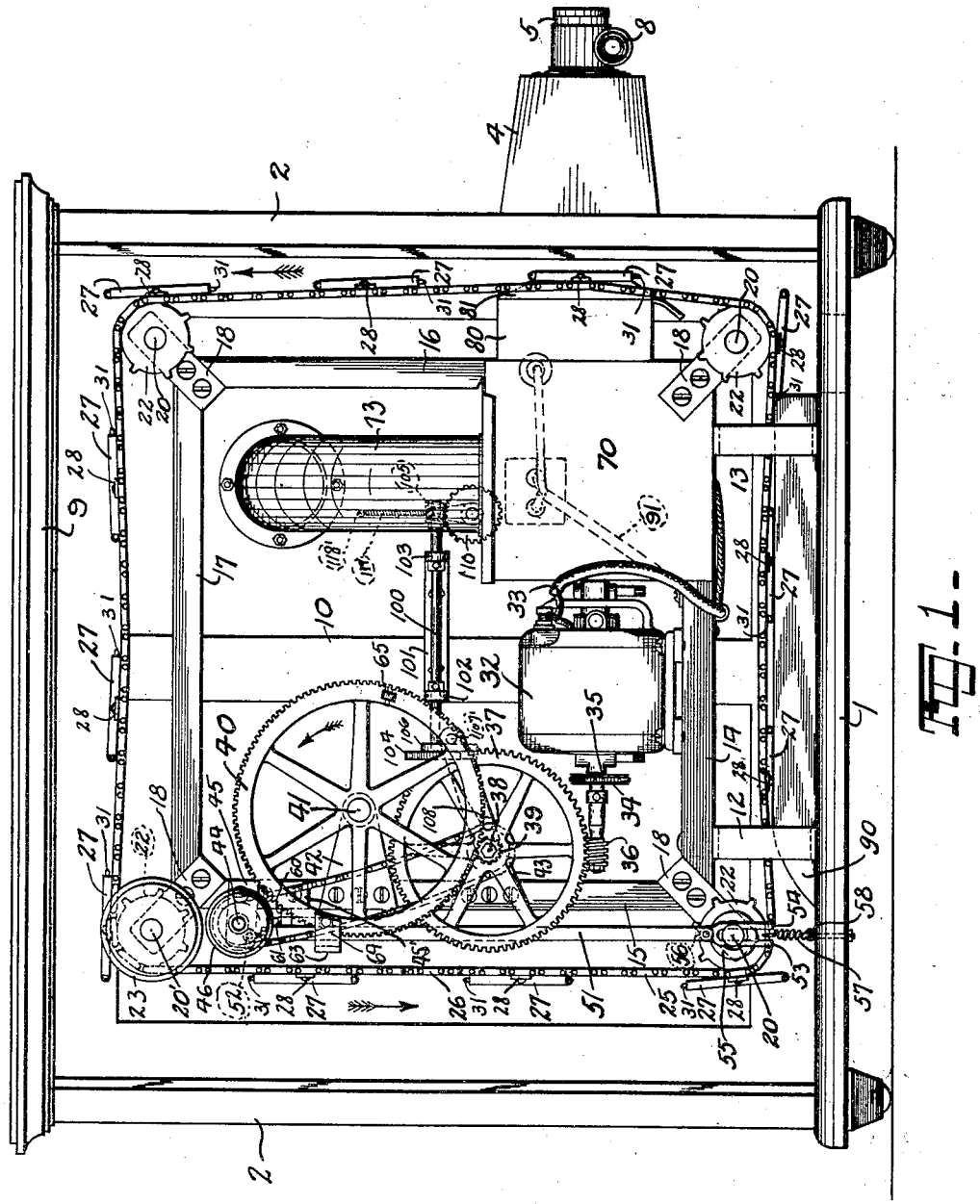
INVENTOR.
EARL L. GILMORE.
BY
Carlos P. Griffin
ATTORNEY.

E. L. GILMORE.
LANTERN SLIDE EXHIBITION APPARATUS.
APPLICATION FILED AUG. 1, 1916.
1,245,454.
Patented Nov. 6, 1917.
5 SHEETS—SHEET 2.
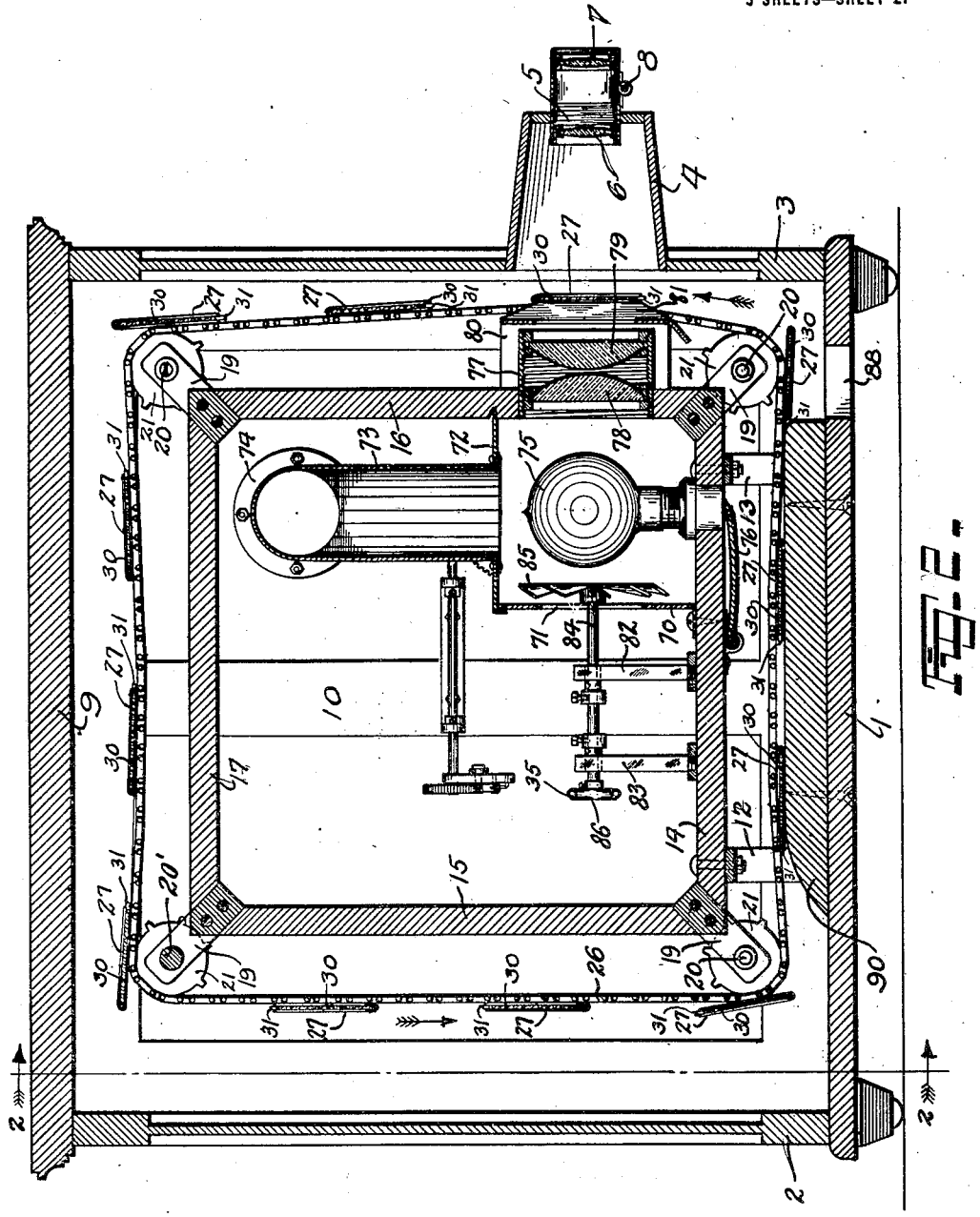
*INVENTOR.*
*EARL L. GILMORE.*
BY
*Carlos P. Griffin*
ATTORNEY.

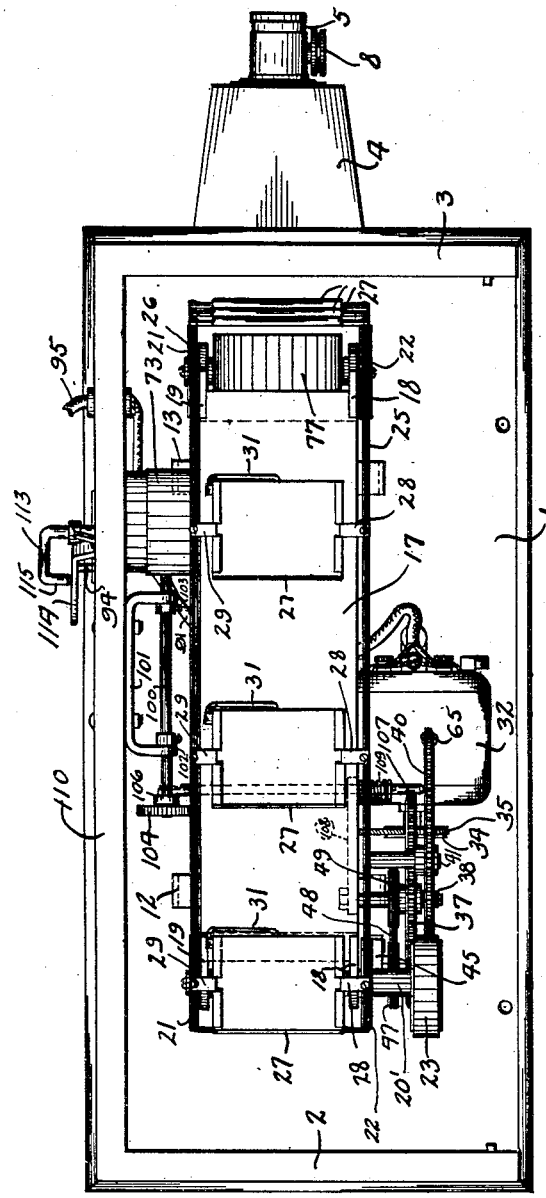
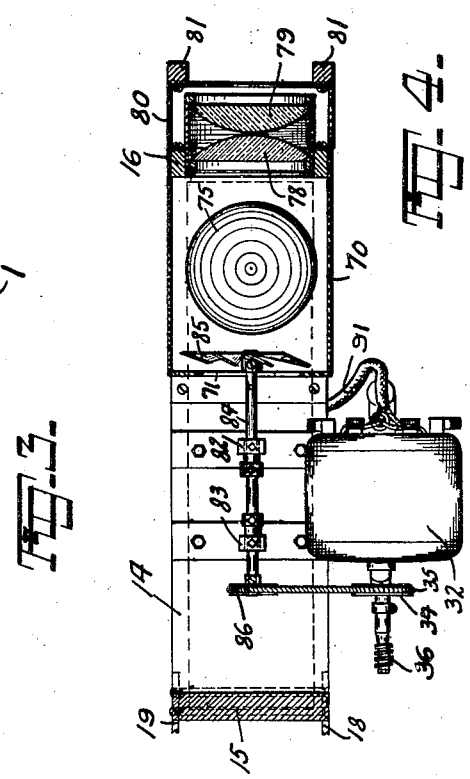

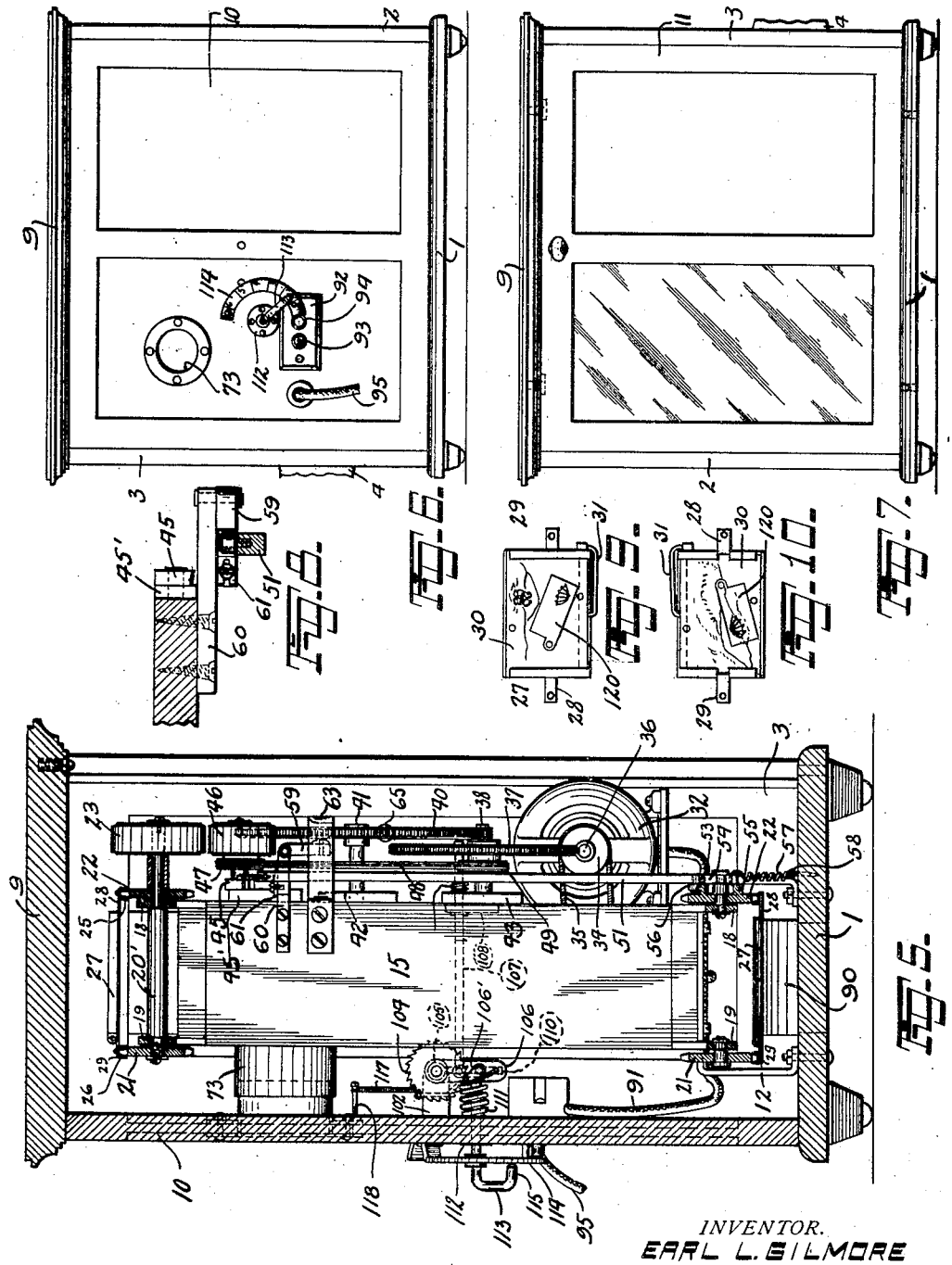

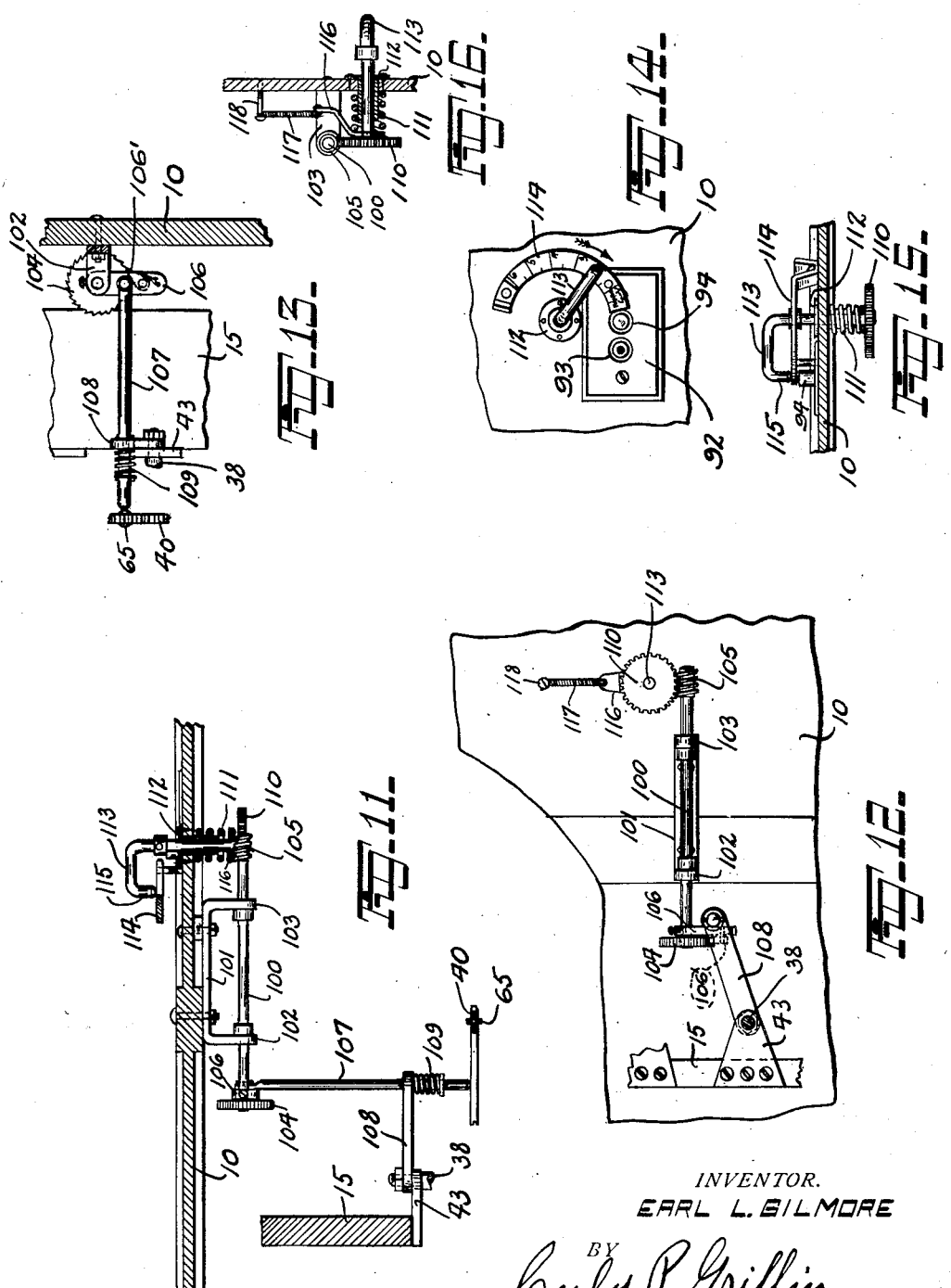

UNITED STATES PATENT OFFICE.

EARL L. GILMORE, OF SAN FRANCISCO, CALIFORNIA, ASSIGNOR TO VITASLIDE COMPANY, OF SAN FRANCISCO, CALIFORNIA, A COPARTNERSHIP CONSISTING OF L. M. KAISER, EARL L. GILMORE, AND GEORGE BRECK.

LANTERN-SLIDE-EXHIBITION APPARATUS.

1,245,454.      Specification of Letters Patent.      Patented Nov. 6, 1917.

Application filed August 1, 1916. Serial No. 112,517.

*To all whom it may concern:*

Be it known that I, EARL L. GILMORE, a citizen of the United States, residing at San Francisco, in the county of San Francisco, State of California, have invented a new and useful Lantern-Slide-Exhibition Apparatus, of which the following is a specification in such full and clear terms as will enable those skilled in the art to construct and use the same.

This invention relates to an apparatus for the display of lantern slides of the type known as vitaslide, in which there is a movable figure or portion which gives a movement to the picture displayed upon the screen.

An object of the invention is to provide means whereby the slide will be reversed in position in order to enable the movable portion of the slide to be restored to its initial position and to maintain the slide in such a position at all times until the slide is ready to be exposed as will hold the movable part of the slide in the initial position to give the desired movement when the exposure is made, the slide being moved to the exposure position in an exceedingly short time after it has been turned to the position in which the movable part begins to travel down, thereby giving the movement to the picture shown upon the screen.

Another object of the invention is to provide means whereby the slide will be kept cool by a current of air discharged from the apparatus by a small fan.

Another object of the invention is to provide means whereby the intermittent action of the belt carrying the slides may be controlled and positively stopped at a determinate position, thereby precisely positioning each slide.

Another object of the invention is to provide means whereby the person using the apparatus for the exhibition of slides may set it in motion and allow it to run for any desired length of time, at the end of which time it will automatically cut itself off and stop, thereby economizing in current and save useless operation of the machine.

Other objects of the invention will appear as the description proceeds.

An embodiment of the invention is shown in the drawing in which the same reference numeral is applied to the same portion throughout but I am aware that there may be many modifications thereof, Figure 1 is a side elevation of the complete machine with one of the sides of the case removed for purposes of illustration, Fig. 2 is a vertical sectional view through the center of the entire apparatus, Fig. 3 is a plan view of the complete machine with the top removed for purposes of illustration, Fig. 4 is a plan view in section of that portion of the machine adjacent the lamp, fan and motor, Fig. 5 is an end elevation of the machine looking from the left Fig. 2, a portion of the casing of the machine being cut away for the purpose of viewing the interior mechanism, Fig. 6 is a side elevation of the complete machine looking in the opposite direction from Fig. 1 and on a slightly smaller scale, Fig. 7 is a side elevation of the complete machine looking in the same direction as Fig. 1, and both Figs. 6 and 7 being on a slightly smaller scale than Fig. 1 and the projecting lens being removed from each of said figures, Fig. 8 is a plan view of the throw adjusting mechanism for determining the movement of the clutch rollers, Figs. 9 and 10 are side elevations of a slide and the holder therefor showing the movable part of the slide in two different positions, Fig. 11 is a plan view of the timing portion of the apparatus, Fig. 12 is a side elevation of the timing portion of the apparatus, Fig. 13 is an end view of the timing apparatus, Fig. 14 is a side elevation of the timing apparatus showing the switch for stopping the motor, Fig. 15 is a plan view of a portion of the timing apparatus and illustrating the position of the push buttons for disconnecting the motor circuit, and Fig. 16 is a vertical sectional view of the timing mechanism showing the spring for balancing the track of the setting handle.

The machine is mounted in a casing having a base 1, end walls 2 and 3, which latter is provided with a tube 4 carrying a projecting lens tube 5, said lens tube carrying a lens 6 and lens 7, which latter lens can be adjusted by means of the usual thumb screw 8. The top of the machine is flat as indicated at 9. The bottom 1, end walls 2 and 3 and top 9 form the frame in which the machine is mounted and the machine is inclosed in the frame by means of the sides 10 and 11, the latter of which is readily removed for the purpose of inspecting the operating mechanism of the machine.

Within the casing and supported from the base by means of two U-shaped brackets 12 and 13 is a rectangular frame having a base 14, ends 15 and 16 and top 17, said frame carrying a pair of brackets 18, 19 diagonally with respect to said frame at each corner thereof, said brackets each supporting a stub shaft 20 and a pair of sprocket wheels 21, 22, the shaft 20' at the upper left hand corner of the frame being longer than the other shafts and carrying a friction roller 23. A pair of sprocket chains 25, 26 extend around the sprocket wheels 21, 22 and said chains support a plurality of frames 27 with ears 28, 29 which connect them to said chains. The frames are for the support of the slides 30 and said slides are held in place in said frames by means of a light spring 31 which bears upon each slide, each frame having one of the lantern slides 30 and one of the springs 31.

The base 14 of the inner frame supports the motor 32 which is driven by electric current supplied by the cable 33 and which is provided with a pulley 34 over which the belt 35 passes. The motor shaft is extended far enough to carry the worm 36 which is in mesh with the worm wheel 37 on a shaft 38. The shaft 38 is also provided with a small gear 39 in mesh with a larger gear 40 on the shaft 41, the latter shaft being supported in a bracket 42 carried by the back 15 of the inner frame. The shaft 38 is supported in a bracket 43 also supported by the back 15 of the inner frame. Above the gear wheel 40 and on the opposite side thereof with respect to the back 15 is a shaft 44 suitably journaled in a bracket 45 and carrying a friction roller 46 and sprocket wheel 47, the latter having a chain 48 passing thereover and under a sprocket wheel 49 on the shaft 38.

The bracket 45 is pivotally supported from the plate 45' on the back 15 and is pivotally connected with the upper end of the long link 51, an adjustable eyebolt 52 being used to make the connection with the bracket 45. The lower end of the link 51 is forked as indicated at 53, 54 and passes over the left hand lower shaft 20, which shaft is provided with a cam 55 in a notch in which the roller 56 may be seated as is shown in Fig. 1. The link 51 is normally held down by means of a spring 57 connected to the base 1 by means of the eyebolt 58 and said link is raised when the machine is in operation by means of a bell crank lever 59.

The bell crank lever 59 is pivotally supported on an arm 60 secured to the back 15 of the inner frame and it has an adjustable wedge 61 on its upper surface which may be moved to provide the necessary adjustment to obtain the desired lift of the link 51 and friction wheel 46. The vertically depending arm of the bell crank lever 59 extends down to the level of an arm 63 which is also secured on the back 15 of the inner frame, said arm having a portion 64 which is on the opposite side of the gear wheel 40 from the depending arm of the bell crank lever 59, the object being to compel a small roller 65 carried by the gear wheel 40 to push the bell crank lever inwardly when said roller passes said bell crank lever without bending the gear wheel out of its proper plane.

The result of the foregoing construction is that as the motor is operated the gear 40 will be slowly turned around and as it is turned the roller 65 will cause the engagement of the wheels 46 and 23 thereby starting the slides to travel, the roller being at the same instant lifted out of the notch in the cam 55 and riding on said cam until the sprocket wheels 21, 22 have made one complete revolution, whereupon the roller 56 will be snapped back into the notch in said cam and the wheel 46 will then be disengaged from the wheel 23 and the slides stopped in the proper position for exhibition purposes.

At the right hand end of the inner frame there is a box 70 having an opening at 71 and a cover plate 72, which cover plate has a pipe 73 connected therewith which is flanged at 74 and open to the atmosphere outside the casing on the side 10. Within the box 70 there is a lamp 75 supplied with electric current from a cable 76 and a tube 77 is secured in the frame member 16 and is provided with two condensing lenses 78, 79 for an object well known in the art. In front of the condensers there is a frame 80 with guide plates 81 to cause the lantern slides to always be presented to the light beam in the same position.

At the back of the box 70 there are two journal bearings 82, 83 which support a shaft 84 carrying a fan 85 driven from a pulley 86, the belt 35 passing over said pulley and around the motor pulley 34. The air current produced by the fan 85 is blown across the lamp and up the pipe 73, the supply of air going into the main casing through an opening 88 in the bottom 1 whereby the lantern slides are kept cool, and since the lantern slide just about to be placed in position for exhibition purposes is over the hole for the incoming air it directs the air up toward the slide being exhibited and thereby assists in keeping it cool during the time it is in the light beam. The false bottom 90 is used for the slides to run on on the lower run of the chains carrying them, in order to always maintain them in a position to carry the movable object within the slide at the lower end of the slide until just prior to the moment when the slides are placed in the light beam for exhibition purposes.

The cables 33 and 76 are joined together in a cable 91 which extends to the switch box 92, said switch having push buttons 93, 94 which operate in a well known manner to make or break the circuit as may be desired, the push button 94 being adapted to break the circuit. The current is supplied to the machine through the cable 95. In order to provide means whereby the apparatus may be set to run for a given period, say three, four, five or six hours a shaft 100 is provided. This shaft is journaled in a plate 101 having journal bearings at 102, 103, which shaft carries a ratchet wheel 104 and a worm 105. A link 106 is loosely mounted upon the shaft and is pivotally connected with a rod 107 and carries a pawl 106'. The rod 107 bears upon the side of the wheel 40, a bracket 108 connecting with the bracket 43 supporting said shaft in the desired position. A spring 109 causes said rod 107 to bear upon the wheel 40 at all times except when the roller 65 pushes said rod to the right, Fig. 13, whereupon the ratchet wheel will be rotated one or more teeth as may be desired.

As the shaft 100 is rotated the worm wheel 110 will be rotated slowly. The worm wheel 110 is carried on a shaft 111 journaled in a bearing 112 and it has an arm 113 with which it can be pulled outwardly far enough to cause the worm wheel 110 to be disengaged from the worm 105, at which time it is possible to set the arm 113 on the segment 114 adjacent any given number thereon, said numbers representing the hours it takes for the worm to rotate the arm back to the position where the arm will fall off the segment 114 and allow the pin 115 to strike the push button 94, thereby cutting off the current from the apparatus. In order to prevent the shaft 111 from binding in its short bearing an arm 116 is loosely supported on said shaft and a spring 117 is connected therewith and with a pin 118 thereby preventing the pin 115 from causing said shaft to bind just as the pin passes off the segment 114. A collar 111' prevents the spring 112 from striking the switch too hard and acts as a stop for the arm.

The operation of the apparatus is as follows: The slide holders are each supplied with a lantern slide such as is illustrated in Figs. 9 and 10, each slide having a movable part 120 to give the desired optical effects, or plain lantern slides may be used if desired. The worm wheel 110 is then disengaged from the worm by pulling outwardly on the arm 113, whereupon the arm is moved to one of the figures on the segment 114, or the arm may be turned around and placed off the segment altogether, whereupon the worm wheel will be disengaged from the worm and the machine will run continuously. The push button 93 may then be operated to close the circuit on the lamp and motor. The machine will then operate and as often as the roller 65 strikes the bell crank lever 59 the wheel 46 will be brought into contact with the wheel 23, and the sprocket chains carrying the pictures will be moved forward one complete turn of the sprocket wheels around which they pass, the roller 56 stopping the chains as soon as it drops into the notch in the cam 55. At the same time the roller 65 will be intermittently operating the pawl wheel 104 and as soon as it has run the desired number of hours the machine will be stopped.

While the apparatus is especially adapted to display all kinds of slides with movable parts therein it may be used with any kind of slides equally well.

Having thus described my invention what I claim as new and desire to secure by Letters Patent of the United States, is as follows, express reservation being made of permissible modifications:

1. A motion slide exhibition apparatus comprising a casing, a lantern slide carrier therein, a lamp, lenses for projecting the rays of the lamp through the slides, means to invert the slides, after being exhibited, means to carry the slides to a point adjacent the exhibition position with their upper edges lower than their bottom edges, and means to right the slides and move them to the exhibition position in a single continuous momentary movement.

2. A motion slide exhibition apparatus comprising a casing, a lantern slide carrier therein, a lamp, lenses for projecting the rays from said lamp through the lantern slides and upon a screen, means whereby the lantern slide carrier will be inverted after the exhibition and placed in the plane of exhibition just immediately prior to said exhibition whereby suitable effects may be obtained with said lantern slides, and means whereby the slides will be moved to the display position after said change in a momentary continuous movement.

3. A motion slide exhibition apparatus comprising a casing, a lantern slide carrier therein, means to intermittently move the lantern slide carrier after the exhibition of a slide to present a new slide, a lamp, lenses to cause the rays from said lamp to be passed through the lantern slide and upon a screen, a fan for cooling that portion of the apparatus adjacent the lamp and for causing a draft of cool air to pass over the lantern slides while being exhibited, means to change the plane of the lantern slides and carriers therefor just immediately prior to the exhibition thereof, and means whereby the slides will be moved to the display position after said change in a momentary continuous movement.

4. A motion slide exhibition apparatus comprising a casing, a lantern slide carrier therein, means to move said carrier intermittently to present a plurality of lantern slides for exhibition purposes, a lamp, a plurality of lenses for directing the rays from said lamp through the lantern slide and upon a screen, means to change the plane of the lantern slide carriers just prior to the exhibition of said lantern slides, and means whereby the slides will be moved to the display position after said change in a momentary continuous movement.

5. A motion slide exhibition apparatus comprising a casing, a lantern slide carrier therein, means to move the lantern slide carrier intermittently to present different slides for exhibition, a lamp, lenses for passing the rays of said lamp through the lantern slide and upon a screen, a fan for cooling the machine adjacent the lamp and for directing a blast of cool air over the lantern slides while being exhibited, means to invert the slides after being exhibited and to carry them with the top edge below the bottom edge to a position adjacent the exhibition position, and means for changing the plane of the lantern slides and lantern slide carrier and moving them in a single continuous momentary motion to the exhibition position just previous to the exhibition of the lantern slides.

6. A motion slide exhibitor comprising a casing, means therein for exhibiting lantern slides, a motor for operating the exhibition apparatus, an electric lamp for supplying light for exhibition purposes, a switch for closing the circuit on said lamp, and on said motor, a spring operated arm, and means to cause said arm to be turned so that it will operate the said switch to shut off the machine after a predetermined time.

7. A motion slide exhibitor comprising a casing, a lantern slide carrier therein, a lamp, a lens for projecting light through the slides, means to invert the slides after they have been exhibited, means to carry the top of the slide after being inverted below the bottom thereof until it has nearly returned to the exhibition position, means to right the slide and to move it momentarily and continuously after being righted to the exhibition position.

8. A motion slide exhibitor comprising a casing, slide exhibition apparatus therein including an endless slide carrier, a friction roller for driving the endless carrier, a movable roller to engage the first mentioned roller, a link connected therewith, means to raise the link and second roller so the latter will engage and drive the first roller, and a notched cam on which the link rides until one turn of the cam has been made.

9. A motion slide exhibitor comprising a casing, means therein for automatically exhibiting a series of slides in succession including an electric motor and lamp, a switch for the electric circuits, an adjustable arm, and means to advance said arm against the switch to automatically cut off the current at said switch after the expiration of a predetermined time.

10. A motion slide exhibitor comprising a casing, means therein including a pair of endless chains, a motor and an electric lamp for exhibiting a series of lantern slides in succession, a switch for operating the electric circuits, an arm, a spring connected therewith, a dial over which the arm travels, and means whereby said arm will operate the switch to stop the machine after a predetermined time when the arm passes off the dial.

11. A motion slide exhibitor comprising a casing, means therein for exhibiting a series of slides in succession, including an electric lamp and a switch, a slowly revoluble member, an adjustable arm operatively connected therewith, and means to advance the arm against the switch to stop the apparatus after a predetermined length of time.

In testimony whereof I have hereunto set my hand this 22nd day of July A. D. 1916, in the presence of the two subscribed witnesses.

EARL L. GILMORE.

Witnesses:
Mrs. M. Gill,
Madeleine Scriven.